(12) United States Patent
Kim et al.

(10) Patent No.: US 12,280,451 B2
(45) Date of Patent: *Apr. 22, 2025

(54) HAMMER DEVICE, APPARATUS FOR DETECTING FAULT OF WELDED PART, AND METHOD USING THE SAME

(71) Applicants: Hyundai Motor Company, Seoul (KR); Kia Corporation, Seoul (KR)

(72) Inventors: ByeongMoo Kim, Ulsan (KR); Junho Jeon, Ulsan (KR); Injoo Kwon, Yeosu-si (KR); Tae-Hwi Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,087

(22) Filed: Dec. 28, 2023

(65) Prior Publication Data

US 2024/0123553 A1 Apr. 18, 2024

Related U.S. Application Data

(62) Division of application No. 17/333,257, filed on May 28, 2021, now Pat. No. 12,172,239.

(30) Foreign Application Priority Data

Nov. 2, 2020 (KR) .................. 10-2020-0144156

(51) Int. Cl.
| | | |
|---|---|---|
| *B23K 31/12* | (2006.01) | |
| *G01H 13/00* | (2006.01) | |
| *G01M 7/08* | (2006.01) | |
| *G01N 3/32* | (2006.01) | |
| *G01N 3/34* | (2006.01) | |
| *G01N 19/08* | (2006.01) | |

(52) U.S. Cl.
CPC .......... *B23K 31/125* (2013.01); *G01H 13/00* (2013.01); *G01M 7/08* (2013.01); *G01N 3/32* (2013.01); *G01N 3/34* (2013.01); *G01N 19/08* (2013.01)

(58) Field of Classification Search
CPC ......... G01H 13/00; G01M 7/08; G01N 19/08; G01N 3/32; G01N 3/34; B23K 31/125
USPC ........................................................ 73/579
See application file for complete search history.

(56) References Cited

FOREIGN PATENT DOCUMENTS

| | | | |
|---|---|---|---|
| CN | 103792055 A | | 5/2014 |
| CN | 105759076 A | * | 7/2016 |
| CN | 107490463 A | | 12/2017 |
| CN | 209541987 U | | 10/2019 |
| CN | 111830062 A | | 10/2020 |
| JP | 2000131295 A | * | 5/2000 |

(Continued)

OTHER PUBLICATIONS

Machine translation of WO_8907249 (Year: 1989).*

(Continued)

*Primary Examiner* — John E Breene
*Assistant Examiner* — Rose M Miller
(74) *Attorney, Agent, or Firm* — Slater Matsil, LLP

(57) ABSTRACT

An embodiment hammer device includes a driver, an upper body configured to move in a direction set by power generated from the driver, an elastic body provided on the upper body, a hammer provided in the elastic body, a force sensor provided in the hammer, and a support configured to support the elastic body and the hammer.

13 Claims, 12 Drawing Sheets

(56) References Cited

FOREIGN PATENT DOCUMENTS

JP          3568400 B2      9/2004
JP        2006284340 A  * 10/2006
WO      WO-8907249 A1 *  8/1989

OTHER PUBLICATIONS

Machine translation of JP_2000131295 (Year: 2000).*
Machine translation of JP_2006284340 (Year: 2006).*
Machine translation of CN_105759076 (Year: 2016).*
Translation of CN_105759076 obtained from Espacenet (Year: 2016).*

* cited by examiner

HAMMER DEVICE, APPARATUS FOR DETECTING FAULT OF WELDED PART, AND METHOD USING THE SAME

CROSS-REFERENCE TO RELATED APPLICATIONS

This application is a divisional of U.S. application Ser. No. 17/333,257, filed on May 28, 2021, which claims the benefit of Korean Patent Application No. 10-2020-0144156, filed on Nov. 2, 2020, which application is hereby incorporated herein by reference.

TECHNICAL FIELD

The present invention relates to an apparatus for detecting parts of a vehicle and a detection method using the same.

BACKGROUND

Many parts constituting an automatic transmission of a vehicle are assembled by welding, and electron beam welding (EBW) is widely used as a welding method.

In the case of welding parts through electron beam welding, welding faults often occur due to magnetization of the parts, electron beams, or environmental influences.

Conventionally, a visual inspection method of identifying a welding fault by visually inspecting a welded portion, or a cutting inspection method of determining whether or not a fault has occurred by cutting a welded part, has been used in order to detect the welding fault.

The visual inspection method can be used for a total inspection, but there is a problem that a welding depth of a welded area or misalignment of the welding cannot be identified. In addition, although the cutting inspection method can accurately determine the welding fault, there is a problem in that the total inspection cannot be performed because parts must be destroyed, and only a sampling inspection has to be performed.

The above information disclosed in this Background section is only for enhancement of understanding of the background of the invention, and therefore it may contain information that does not form the prior art that is already known to a person of ordinary skill in the art.

SUMMARY

Embodiments of the present invention provide a hammer device capable of performing a total inspection, a fault detection apparatus for welding parts including the same, and a method thereof.

An embodiment of the present invention provides a hammer device including a driver, an upper body configured to move in a direction that is set by power generated from the driver, an elastic body provided on the upper body, a hammer provided in the elastic body, a force sensor provided in the hammer, and a support configured to support the elastic body and the hammer.

A hammer frame supporting the hammer may be provided in the elastic body.

The support may be formed of an elastic material to absorb vibration of the hammer and the elastic body.

The hammer device may further include an adjustment device configured to adjust a position of the upper body.

An embodiment of the present invention provides a fault detection apparatus for a welding part including a hammer device configured to apply an external force to a target part to be measured and to measure a magnitude of the force applied to the target part, a vibration sensor that measures a vibration generated in response to a force applied to the target part by the hammer device, and a controller configured to calculate a frequency response function (FRF) that inputs the force applied to the target part by the hammer device and outputs the vibration sensed by the vibration sensor, and to determine whether the component to be measured is faulty based on whether peak values are detected in the peak-in region and the peak-out region of the frequency response function.

The hammer device may include a driver, an upper body configured to move in a direction that is set by a power generated from the driver, an elastic body provided on the upper body, a hammer provided in the elastic body, a force sensor provided in the hammer, and a support configured to support the elastic body and the hammer.

The support may be formed of an elastic material to absorb vibration of the hammer and the elastic body.

The controller may determine that the target part is faulty when the peak value is not detected in the peak-in region of the frequency response function.

The controller may determine that the target part is faulty when the peak value is detected in a peak-out region of the frequency response function.

An embodiment of the present invention provides a fault detection method for welding parts including detecting a force applied to a target part to be measured by a force sensor, detecting a vibration that is generated in the target part by a vibration sensor, calculating a frequency response function (FRF) that inputs the force detected by the force sensor and outputs the vibration sensed by the vibration sensor by a controller, setting a peak-in region and a peak-out region that are predetermined in the frequency response function by the controller, and determining whether the target part is faulty based on whether peak values are detected in the peak-in region and the peak-out region of the frequency response function by the controller.

The determining of whether the target part is faulty may include determining that the target part is faulty when the peak value is not detected in a peak-in region, and determining that the target part is faulty when the peak value is detected in the peak-out region.

In accordance with the hammer device, the fault detection apparatus including the same, and the method thereof according to the embodiments of the present invention as described above, it is possible to accurately determine whether or not it is faulty through a total inspection of the target part by comparing the frequency response function of the good product and the frequency response function of the target part.

BRIEF DESCRIPTION OF THE DRAWINGS

The drawings are intended to be used as references for describing the exemplary embodiments of the present invention, and the accompanying drawings should not be construed as limiting the technical spirit of the present invention.

Figure 1:
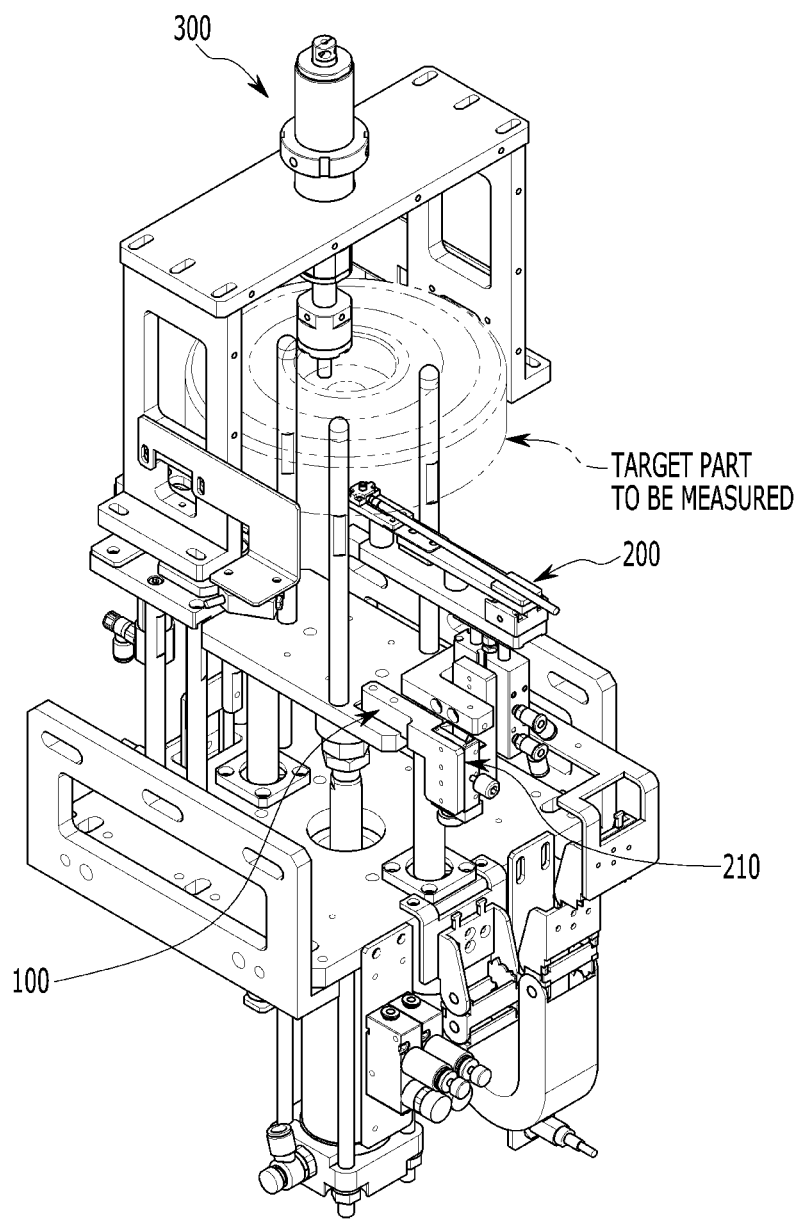
FIG. 1 illustrates a perspective view showing a configuration of a fault detection apparatus for a welding part according to an embodiment of the present invention.

The following elements may be used in connection with the drawings to describe embodiments of the present invention.

100: base frame
200: hammer device
210: adjustment device
211: adjustment frame
212: adjustment groove
214: adjustment nut
218: movement frame
219: connection frame
220: driver
230: upper body
240: elastic body
241: fixing frame
250: hammer
251: force sensor
252: hammer frame
260: support
300: vibration sensor
400: controller
500: display device

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly describe embodiments of the present invention, parts that are irrelevant to the description are omitted, and identical or similar constituent elements throughout the specification are denoted by the same reference numerals.

In addition, since the size and thickness of each configuration shown in the drawings are arbitrarily shown for convenience of description, embodiments of the present invention are not necessarily limited to configurations illustrated in the drawings, and in order to clearly illustrate several parts and areas, enlarged thicknesses are shown.

Hereinafter, a fault detection apparatus for a welding part according to an embodiment of the present invention will be described in detail with reference to the accompanying drawings.

Figure 2:
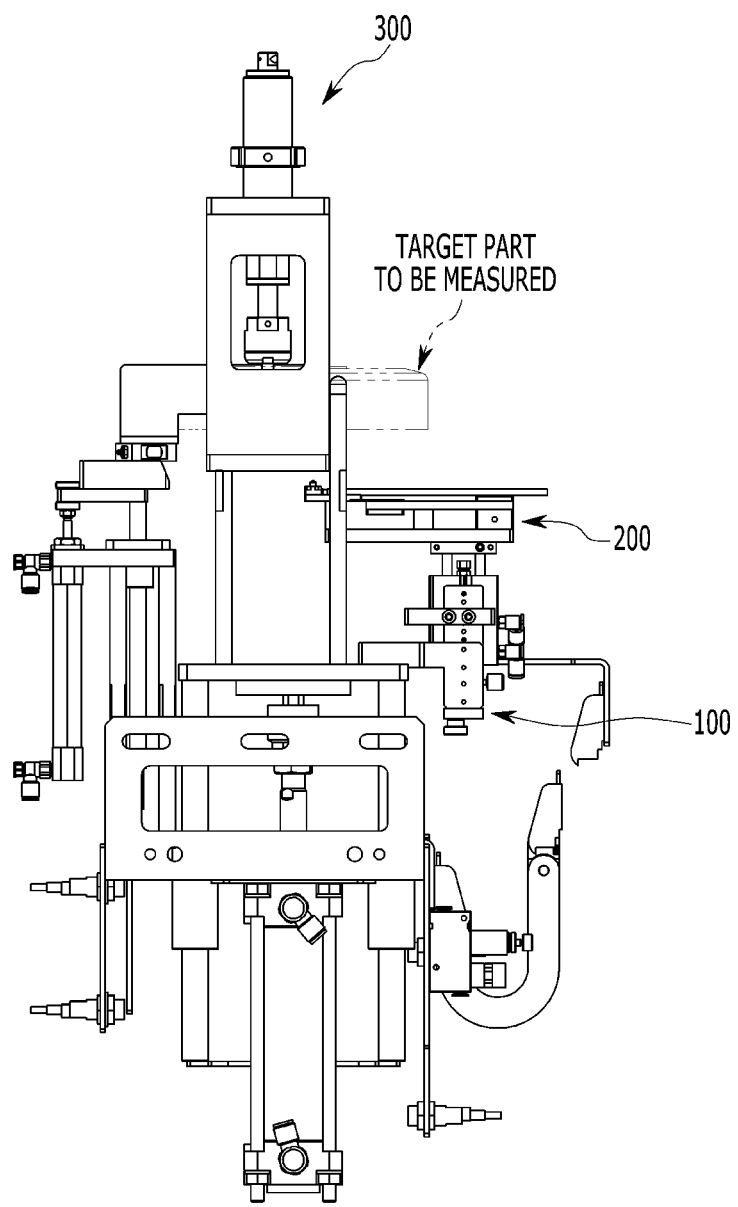
FIG. 2 illustrates a perspective view showing a configuration of a fault detection apparatus for a welding part according to an embodiment of the present invention.
Figure 3:
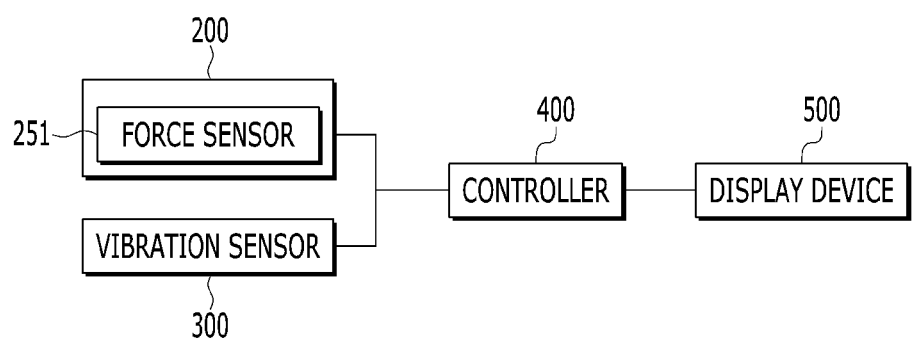
FIG. 3 illustrates a block diagram showing a configuration of a fault detection apparatus for a welding part according to an embodiment of the present invention.

FIG. 1 illustrates a perspective view showing a configuration of a fault detection apparatus for a welding part according to an embodiment of the present invention. FIG. 2 illustrates a perspective view showing a configuration of a fault detection apparatus for a welding part according to an embodiment of the present invention. FIG. 3 illustrates a block diagram showing a configuration of a fault detection apparatus for a welding part according to an embodiment of the present invention.

As illustrated in FIGS. 1 to 3, the fault detection apparatus for a welding part according to an embodiment of the present invention may include a hammer device 200, a vibration sensor 300, a controller 400, and a display device 500.

The hammer device 200 is provided on a base frame 100 provided on a conveyor belt by which a target part to be measured moves. The hammer device 200 applies an external force to the target part, and measures a magnitude of the force applied to the target part. The magnitude of the force measured by the hammer device 200 is transmitted to the controller 400.

The vibration sensor 300 measures a vibration generated in response to the force applied to the target part by the hammer device 200, and the measured vibration is transmitted to the controller 400.

The controller 400 calculates a frequency response function (FRF) that inputs the force applied to the target part by the hammer device 200 and outputs the vibration sensed by the vibration sensor 300, and determines whether or not the target part is faulty based on a peak value that is generated by the frequency response function.

To this end, the controller 400 may be provided with one or more processors operated by a predetermined program, and the predetermined program is configured to perform each step of a fault detection method for a welding part according to an embodiment of the present invention.

Whether the target part is faulty or not as determined by the controller 400 may be displayed on the display device 500. To this end, the display device 500 may be implemented as a liquid crystal display (LCD), a portable terminal such as a smart phone or a tablet computer, or a desktop computer.

The configuration of the hammer device 200 according to an embodiment of the present invention will be described in detail with reference to the accompanying drawings.

Figure 4:
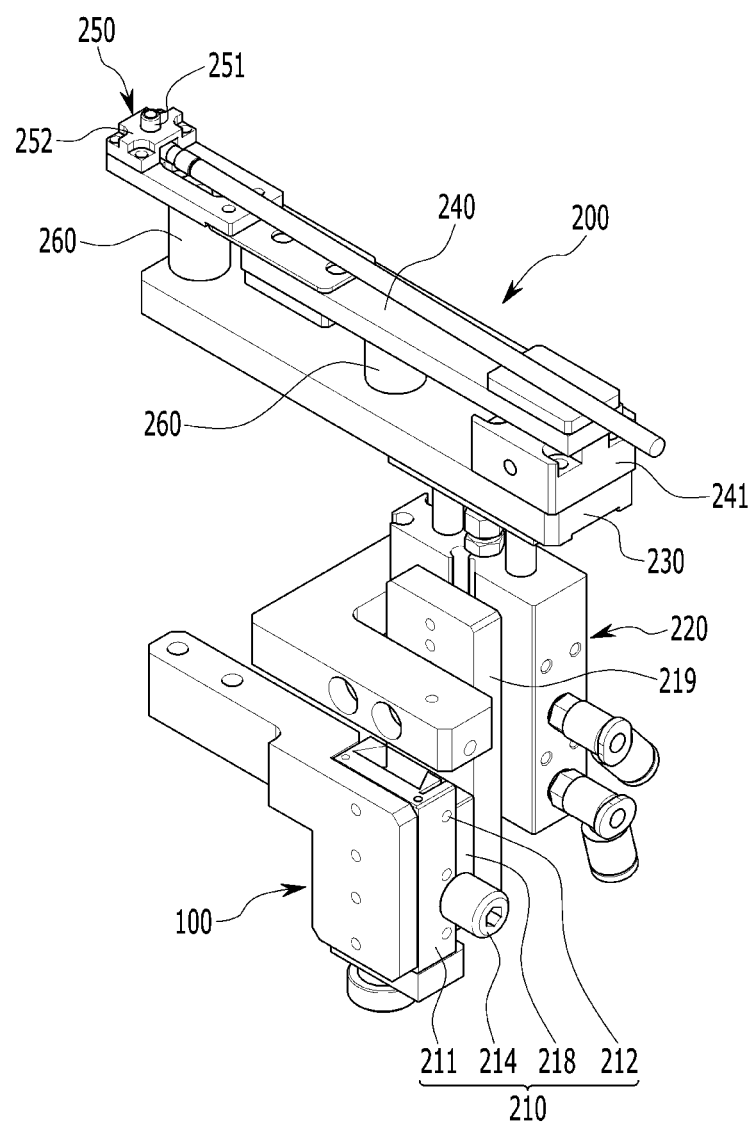
FIG. 4 illustrates a perspective view of a configuration of a hammer device according to an embodiment of the present invention.
Figure 5:
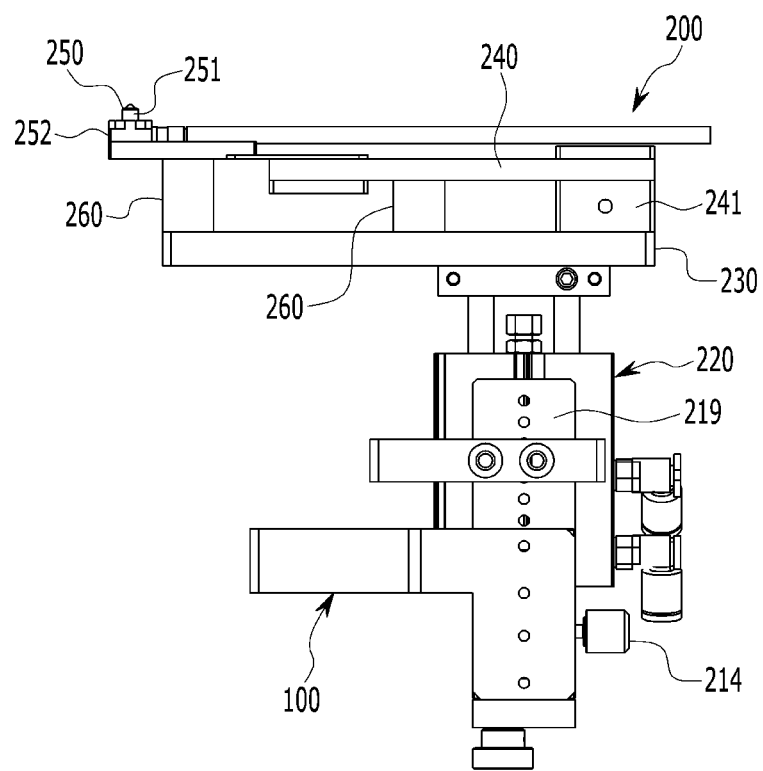
FIG. 5 illustrates a side view of a configuration of a hammer device according to an embodiment of the present invention.

FIG. 4 illustrates a perspective view of a configuration of a hammer device according to an embodiment of the present invention. FIG. 5 illustrates a side view of a configuration of a hammer device according to an embodiment of the present invention.

Referring to FIG. 4 and FIG. 5, the hammer device 200 may include a driver 220, an upper body 230, an elastic body 240, a hammer 250, a force sensor 251, and a support 260.

The driver 220 may be implemented through a hydraulic cylinder or a pneumatic cylinder that moves the upper body 230 in a predetermined direction (e.g., a vertical direction). The driver 220 may be operated by a control signal of the controller 400.

In an embodiment of the present invention, the driver 220 may be mounted on the base frame 100 through an adjustment device 210.

The adjustment device 210, which is for adjusting positions of the driver 220 and the upper body 230 to an appropriate level depending on a size of the target part, may include an adjustment frame 211 fixedly installed on the base frame wo and a movement frame 218 fixedly installed with the upper body 230 to be movable in the vertical direction on the adjustment frame 211. In this case, the moving frame 218 may be mounted to the upper body 230 through a connection frame 219.

A plurality of adjustment grooves 212 may be formed in the adjustment frame 211 in the vertical direction, and an adjustment nut 214 may be inserted into the adjustment grooves 212. A height of the upper body 230 mounted on the movement frame 218 may be adjusted by inserting the adjustment nut 214 into any one of the adjustment grooves 212 of the adjustment frame 211 to fix the movement frame 218.

The upper body 230 reciprocates in a direction that is set by an operation of the driver 220. The elastic body 240 is mounted at a first end of the driver 220. The elastic body 240 may be formed as a silicone rubber pad. The elastic body 240 may be mounted on the upper body 230 through a fixing frame 241 that is mounted at a first end of the upper body 230 to fix the elastic body 240.

A hammer 250 is mounted at a second end of the elastic body 240. In this case, the hammer 250 may be mounted on a hammer frame 252 mounted at the second end of the elastic body 240. The hammer 250 is a component for applying an external force to the target part. Since the first end of the elastic body 240 is mounted on the upper body 230 through the fixing frame 241, the elastic body 240 may serve as a kind of cantilever.

The hammer 250 is mounted at the second end of the elastic body 240 having the first end that is fixed. In this case, the hammer 250 may be mounted on the elastic body 240 through the hammer frame 252 mounted at an end portion of the elastic body 240. The hammer frame 252 may serve to fix the hammer 250 to the elastic body 240, and when an external force is applied to the target part through the hammer 250, it may also serve as an inertial mass.

The force sensor 251 is mounted on the hammer 250, and when an external force is applied to the target part by the hammer 250, the force sensor 251 measures a magnitude of the force applied to the target part, and a measured signal is transmitted to the controller 400. The force sensor 251 may be implemented through an acceleration sensor. For example, the acceleration sensor may detect acceleration generated when the hammer 250 contacts the target part, and may detect a magnitude of the force applied to the target part through the acceleration detected by the acceleration sensor and a mass of the hammer 250.

The support 260 supporting the elastic body 240 and the hammer 250 (or the hammer frame 252 on which the hammer 250 is mounted) may be provided on the upper body 230. The support 260 may be formed as an elastic material (e.g., rubber) so that residual vibration does not occur in the hammer frame 252 and the elastic body 240 restored to an original position thereof after being elastically deformed. To this end, the support 260 may be provided in a lower center of the hammer frame 252 and a lower center of the elastic body 240.

Hereinafter, a method for detecting a fault in a welding part according to an embodiment of the present invention as described above will be described in detail with reference to the accompanying drawings.

Figure 6:
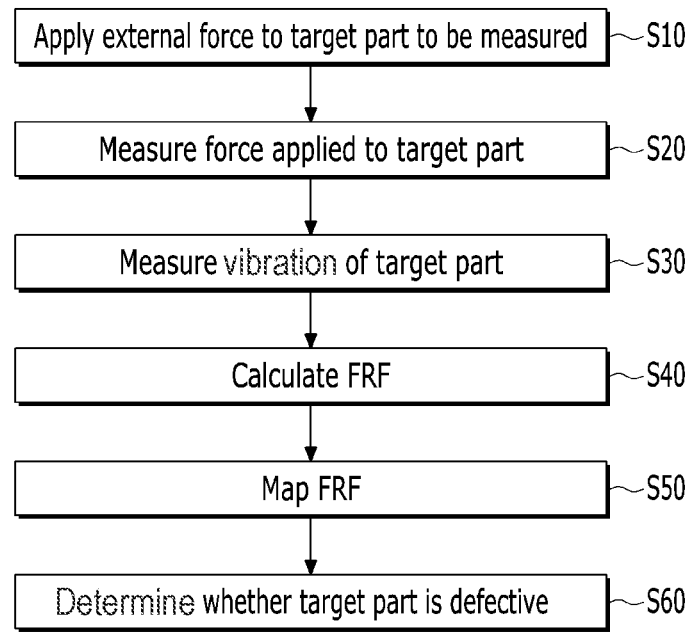
FIG. 6 illustrates a flowchart showing a fault detection method for a welding part according to an embodiment of the present invention.

FIG. 6 illustrates a flowchart showing a fault detection method for a welding part according to an embodiment of the present invention.

Figure 7:
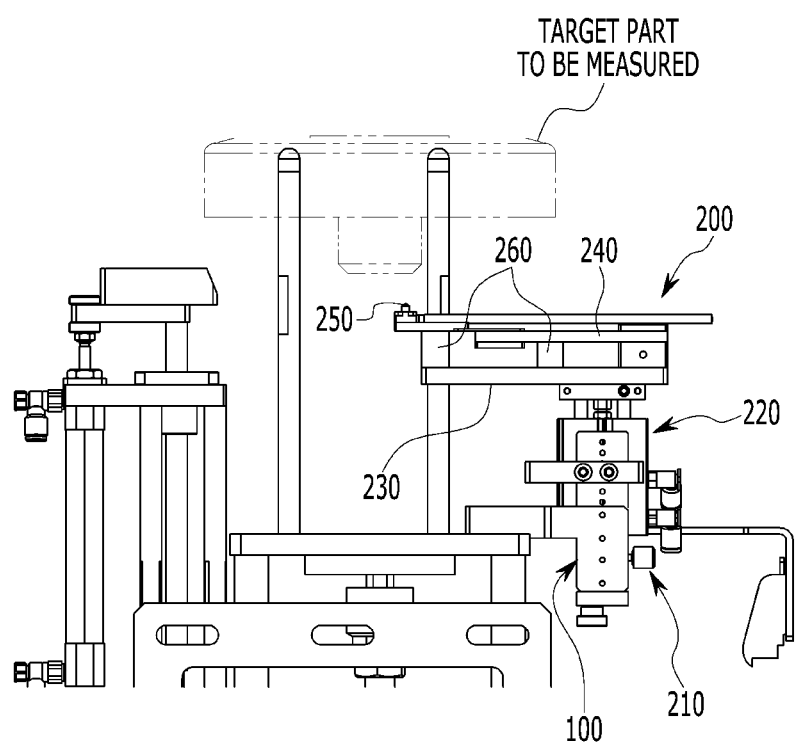
FIG. 7, FIG. 8, FIG. 9 and FIG. 10 illustrate views for describing an operation of a fault detection apparatus for a welding part according to an embodiment of the present invention.

As illustrated in FIG. 6, when a target part to be measured (e.g., a gear module used in an automatic transmission) moves to a predetermined position (e.g., a predetermined position on a conveyor belt), a user adjusts a height of the hammer device 200 in a vertical direction depending on a size of the target part through the adjustment device 210 (see FIG. 7).

When the target part is moved to the predetermined position, the controller 400 applies an external force to the target part by operating the hammer device 200 (S10).

Figure 8:
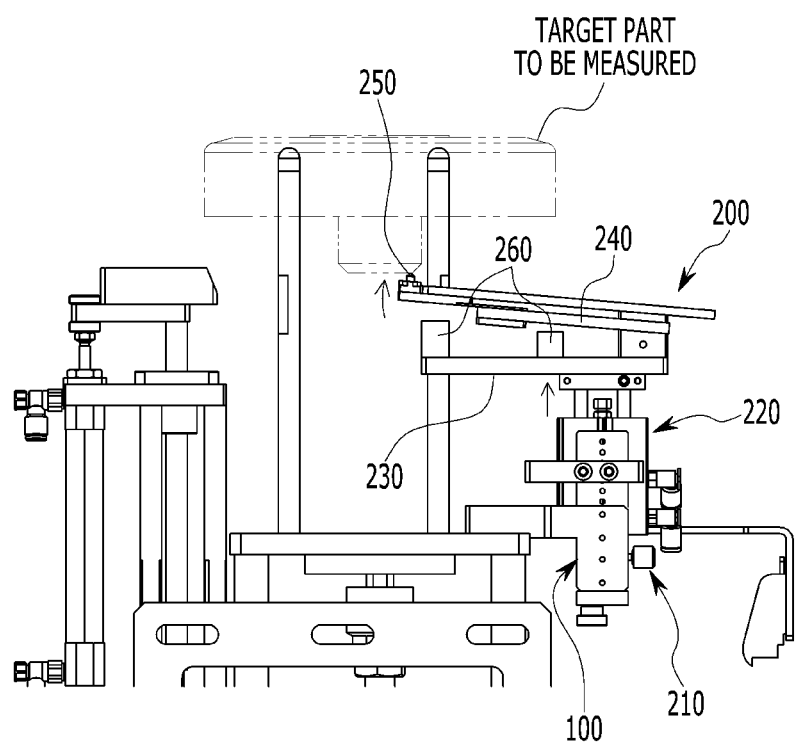
Figure 9:
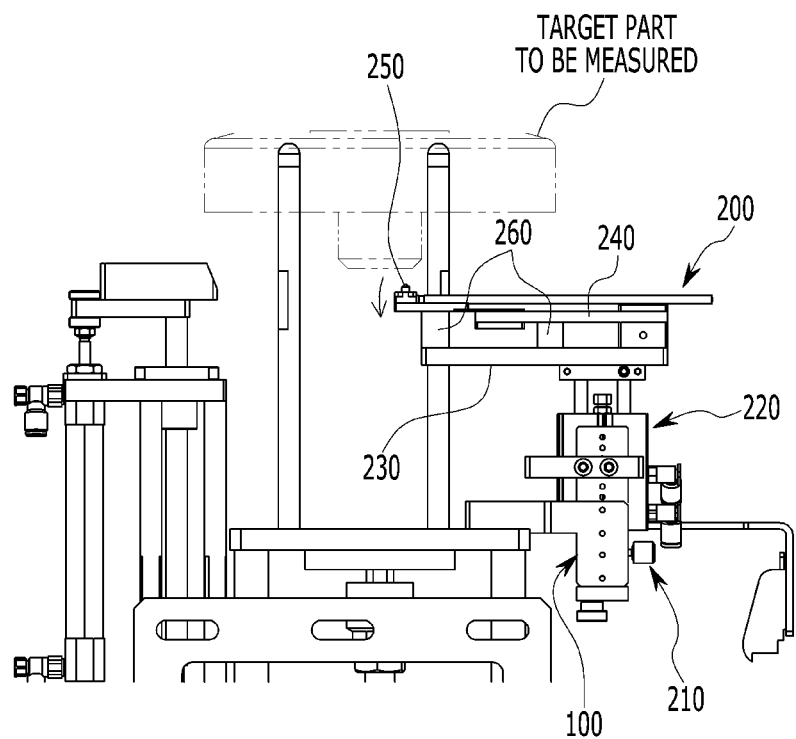
Figure 10:
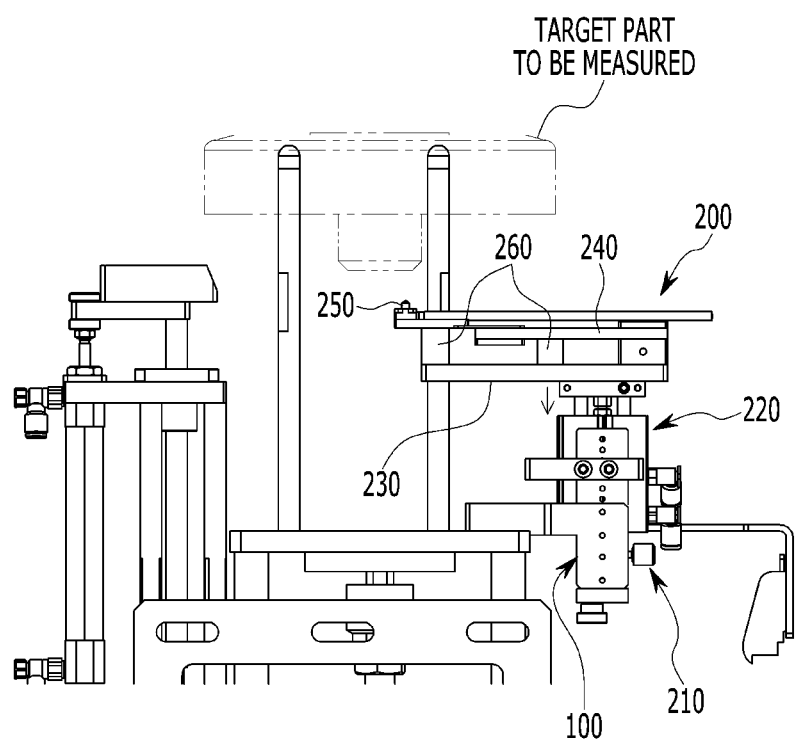

Specifically, when the controller 400 operates the driver 220 (e.g., a pneumatic cylinder or a hydraulic cylinder) in an upward direction, the elastic body 240 mounted at a first end of the driver 220 moves in the upward direction, the hammer 250 applies an external force to the target part while striking the component to be measured while an opposite end of the elastic body 240 on which the hammer 250 is mounted moves upward by elastic deformation (see FIG. 8). When the elastic body 240 on which the hammer 250 is mounted is restored downward, the elastic body 240 and the hammer frame 252 on which the hammer 250 is mounted are seated on the support 260 formed of an elastic material (see FIG. 9 and FIG. 10). Accordingly, it is possible to prevent the elastic body 240 and the hammer frame 252 from vibrating.

The force sensor 251 provided in the hammer 250 measures a magnitude of the force applied to the target part and transmits it to the controller 400 (S20).

The vibration sensor 300 measures the vibration generated by the target part in response to the external force applied to the target part by the hammer 250, and transmits it to the controller 400 (S30).

The controller 400 calculates a frequency response function (FRF) that inputs the force applied to the target part transmitted from the force sensor 251 and outputs the vibration transmitted from the vibration sensor 300 (S40).

A frequency response function for a good product is previously stored in the controller 400, and the controller 400 maps the frequency response function of the good product to the calculated frequency response function (S50).

In this case, a peak-in region and a peak-out region are predetermined in the frequency response function of the good product, and the controller 400 determines whether the target part is faulty based on whether peak values are detected in the peak-in region and the peak-out region (S60).

Herein, the peak-in region refers to a region in which the peak value should be detected in a corresponding frequency region, and the peak-out region refers to a region in which a peak value should not be detected in a corresponding frequency region.

Figure 11:
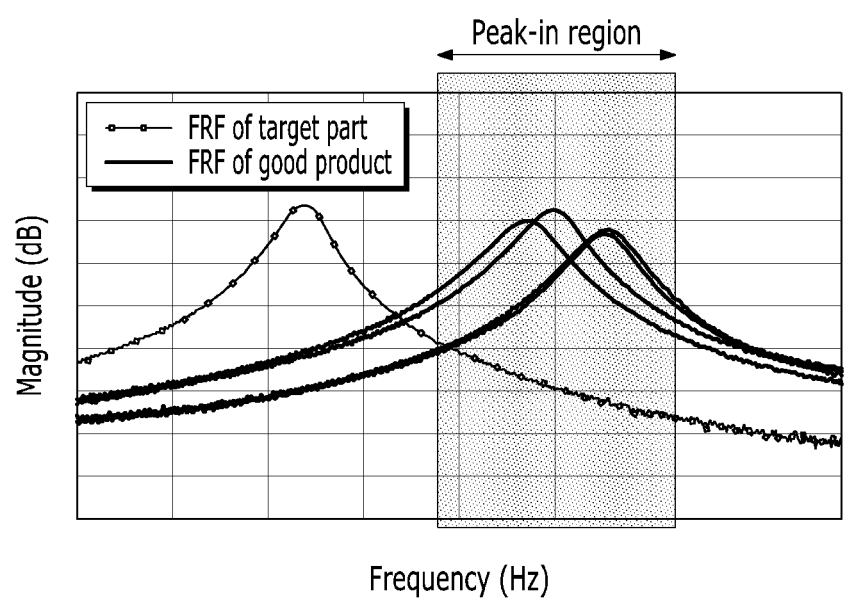
FIG. 11 illustrates a graph showing a frequency response function for describing a peak-in region according to an embodiment of the present invention.
Figure 12:
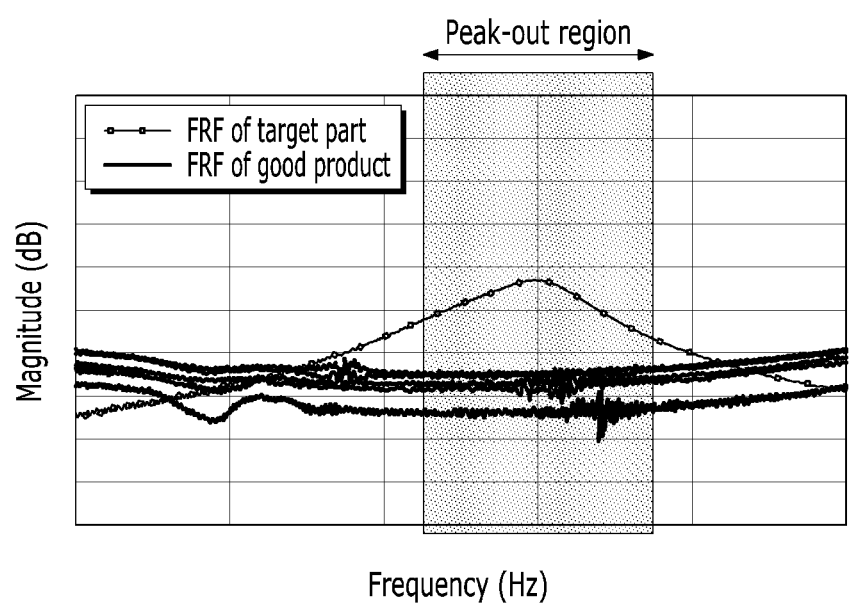
FIG. 12 illustrates a graph showing a frequency response function for describing a peak-out region according to an embodiment of the present invention.

That is, when the peak value is not detected in the peak-in region of the frequency response function calculated from the target part, the controller 400 may determine that the target part is faulty (see FIG. 11). Alternatively, when the peak value is detected in the peak-out region of the frequency response function calculated from the target part, the controller 400 may determine that the target part is faulty (see FIG. 12).

The peak-in region and the peak-out region may be pre-determined by calculating a frequency response function of each of a plurality of target parts. The peak-in area and peak-out area that are predetermined may be pre-stored in the controller 400.

Whether the target part is faulty or not as determined by the controller 400 may be displayed on the display device 500.

In accordance with the fault detection apparatus and method according to the embodiments of the present invention as described above, the frequency response function of the target part may be calculated through the hammer device 200 and the vibration sensor 300, and it is possible to determine whether the target part is faulty from whether peak values are detected in the peak-in region and peak-out region of the frequency response function of the target part. Accordingly, it is possible to quickly identify whether the target part is faulty, and to perform a total inspection on the target part.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hammer device comprising:
   a driver;
   an upper body configured to move in a direction set by power generated from the driver;
   an elastic body provided on the upper body;
   a hammer provided on the elastic body;
   a force sensor provided on the hammer; and
   a support configured to support the elastic body and the hammer.

2. The hammer device of claim 1, wherein a hammer frame configured to support the hammer is provided in the elastic body.

3. The hammer device of claim 1, wherein the support comprises an elastic material configured to absorb vibration of the hammer and the elastic body.

4. The hammer device of claim 1, further comprising an adjustment device configured to adjust a position of the upper body.

5. The hammer device of claim 1, wherein the force sensor is configured to measure a magnitude of a force applied to a target part.

6. A fault detection apparatus comprising:
   a hammer device;
   a vibration sensor; and
   a controller configured to determine whether a target part to be measured is faulty based on inputs received from the hammer device and the vibration sensor;
   wherein the hammer device comprises:
      a driver;
      an upper body configured to move in a direction set by power generated from the driver;
      an elastic body provided on the upper body;
      a hammer provided on the elastic body;
      a force sensor provided on the hammer; and
      a support configured to support the elastic body and the hammer.

7. The fault detection apparatus of claim 6, wherein the controller is configured to calculate a frequency response function based on a force applied to the target part by the hammer device and a vibration measured by the vibration sensor, and to determine whether the target part to be measured is faulty based on whether peak values are detected in a peak-in region and a peak-out region of the frequency response function.

8. The fault detection apparatus of claim 7, wherein the controller is configured to determine that the target part is faulty when the peak values are not detected in the peak-in region of the frequency response function.

9. The fault detection apparatus of claim 7, wherein the controller is configured to determine that the target part is faulty when the peak values are detected in the peak-out region of the frequency response function.

10. The fault detection apparatus of claim 6, wherein a hammer frame configured to support the hammer is provided in the elastic body.

11. The fault detection apparatus of claim 6, wherein the support comprises an elastic material configured to absorb vibration of the hammer and the elastic body.

12. The fault detection apparatus of claim 6, further comprising an adjustment device configured to adjust a position of the upper body.

13. The fault detection apparatus of claim 6, wherein the force sensor is configured to measure a magnitude of a force applied to the target part.

* * * * *